United States Patent [19]
Gregg

[11] Patent Number: 4,462,628
[45] Date of Patent: Jul. 31, 1984

[54] GUIDE FOR COLLAPSIBLE DRAG REDUCER

[75] Inventor: Willard W. Gregg, Troy, Mich.

[73] Assignee: General Motors Corporation, Detroit, Mich.

[21] Appl. No.: 439,789

[22] Filed: Nov. 8, 1982

[51] Int. Cl.³ .............................................. B62D 35/00
[52] U.S. Cl. ..................................................... 296/1 S
[58] Field of Search .................... 296/1 S; 105/2 R, 8, 105/9, 11

[56] References Cited

U.S. PATENT DOCUMENTS

| | | | |
|---|---|---|---|
| 3,711,146 | 1/1973 | Madzsar | 296/1 S |
| 3,834,752 | 9/1974 | Cook | 296/1 S |
| 4,082,340 | 4/1978 | Taylor | 296/1 S |
| 4,102,548 | 7/1978 | Kangas | 296/1 S |
| 4,156,543 | 5/1979 | Taylor | 296/1 S |

*Primary Examiner*—Robert R. Song

*Attorney, Agent, or Firm*—Charles E. Leahy

[57] ABSTRACT

Flexible side members of semi-rigid mold urethane extend between a pivotally mounted deflector panel and the cab roof. The side members are formed of a plurality of foldably interconnected triangular segments which fold and unfold relative one another during movement of the deflector panel between a raised air deflecting position and a stored position upon the cab roof. A guide rod is pivotally mounted upon the deflector panel and depends downward therefrom. A plurality of eyelets are provided on the triangular segments and slidably receive the guide rod. Accordingly, when the deflector panel is raised in the air deflecting position the guide rod and eyelets cooperate to support and control the side member segments against lateral movement. Upon collapse of the deflector panel to the stored position upon the cab roof the guide rod and eyelets maintain the segments in line with one another for controlled stacking one atop another.

2 Claims, 12 Drawing Figures

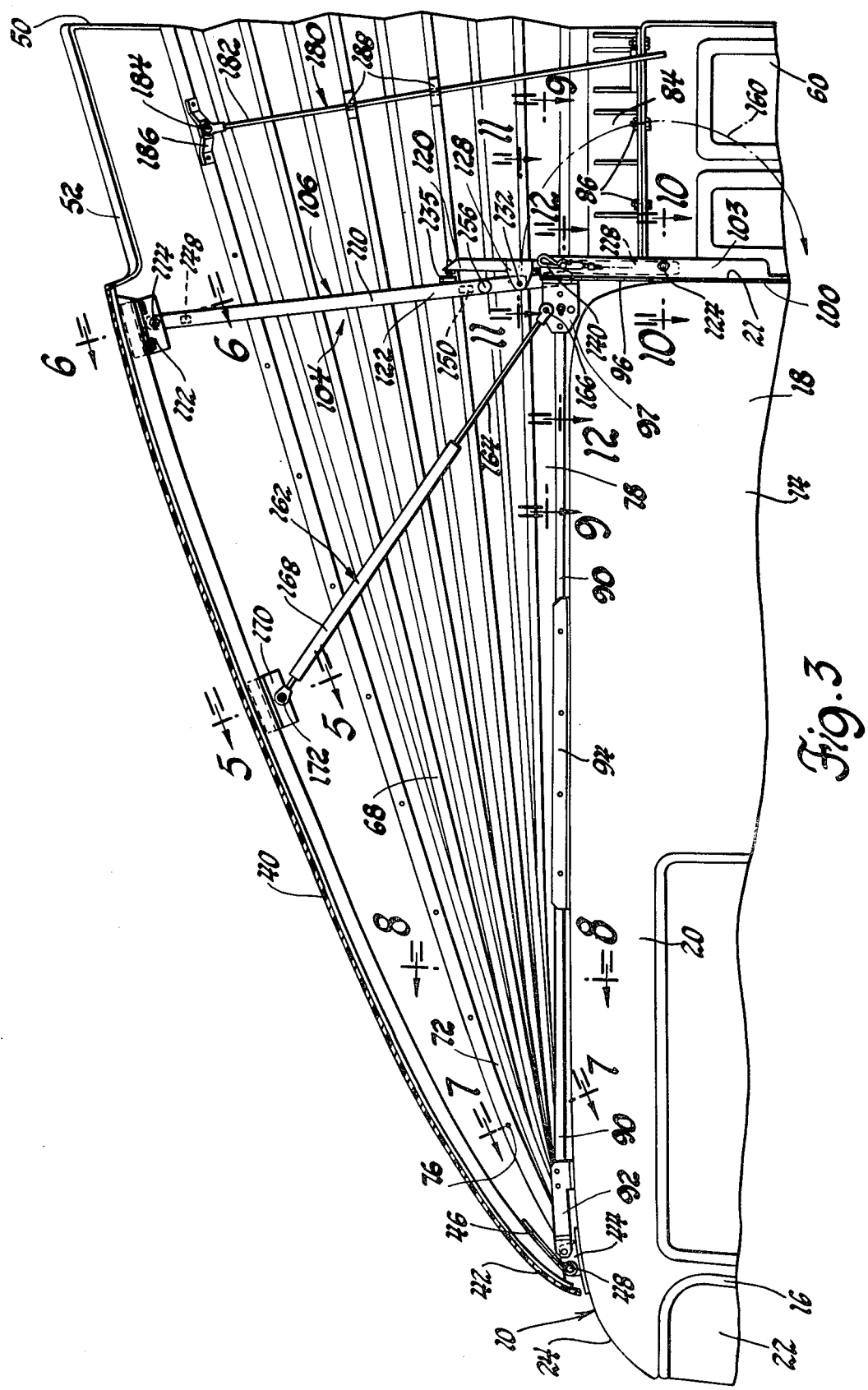

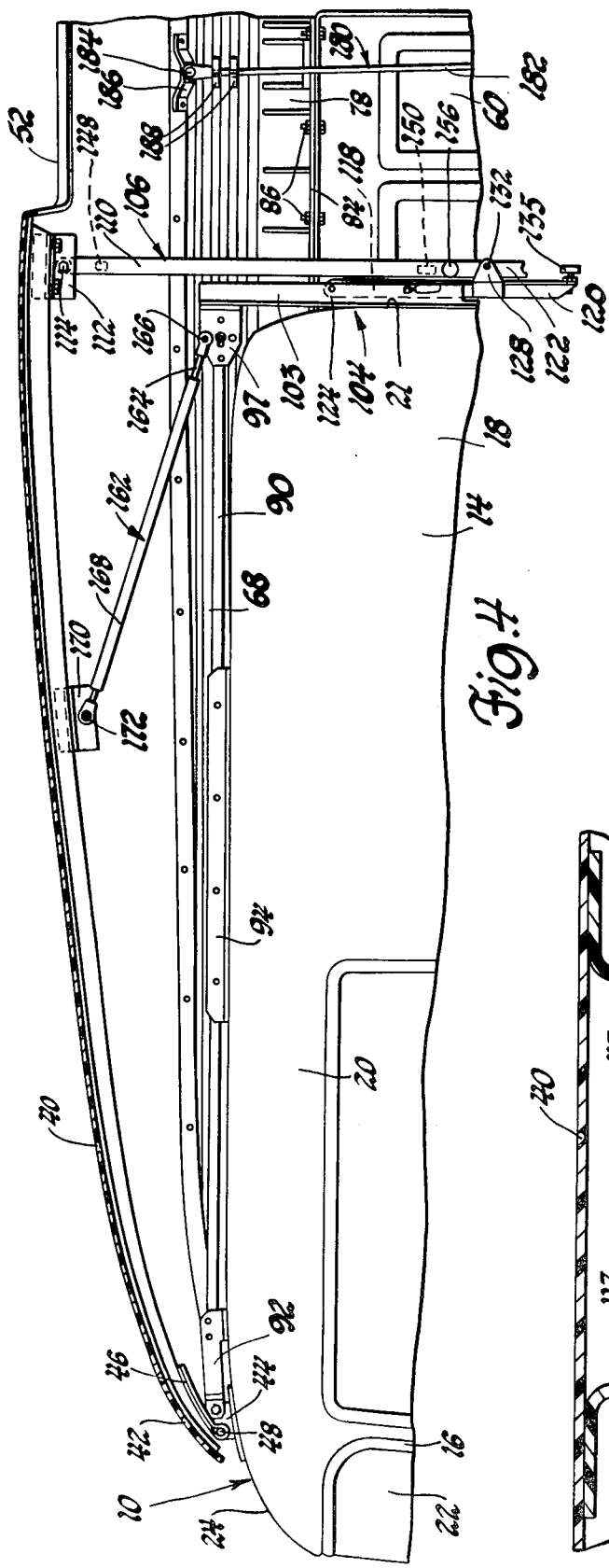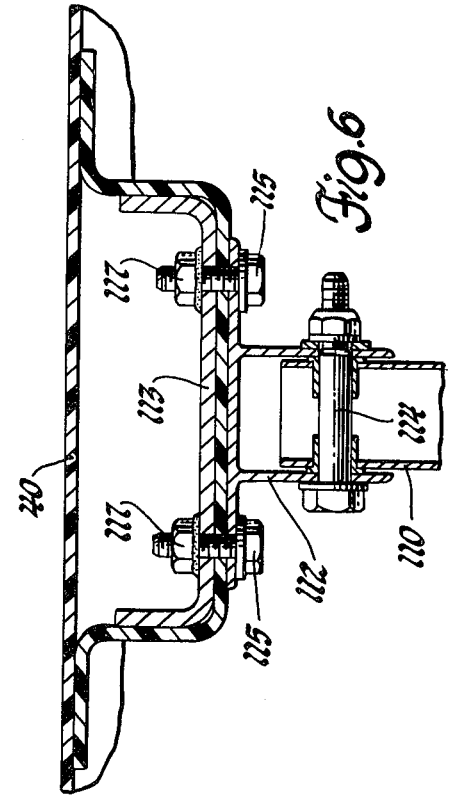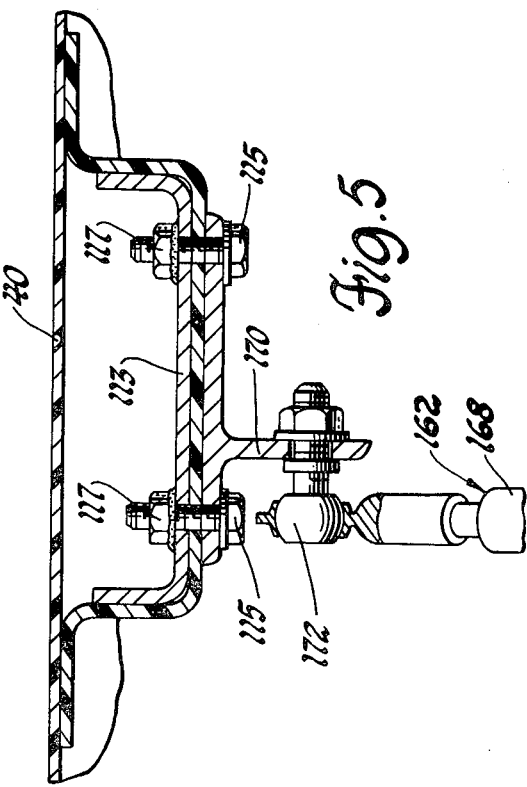

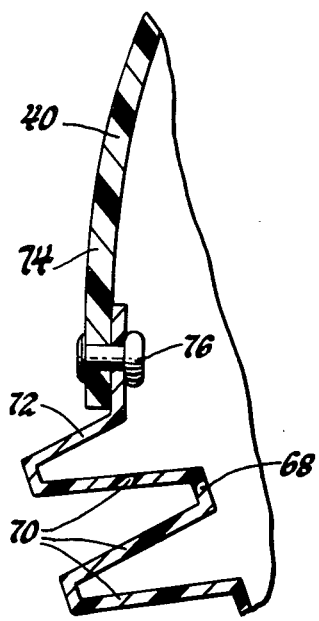
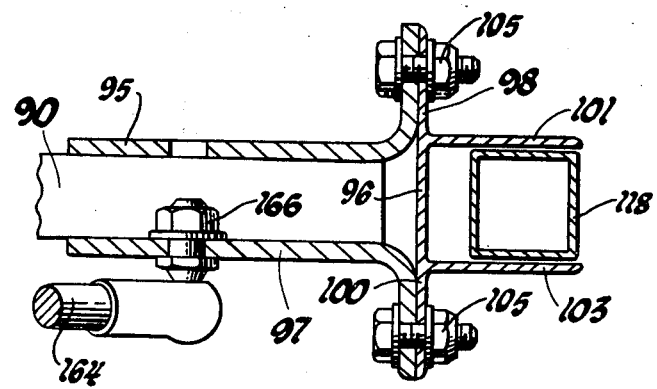
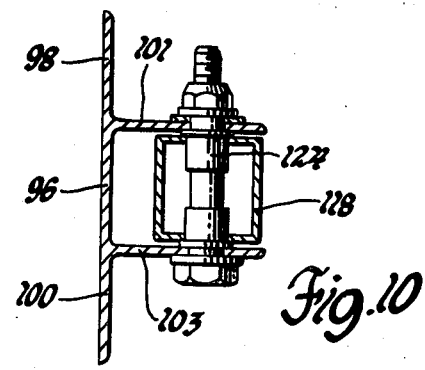
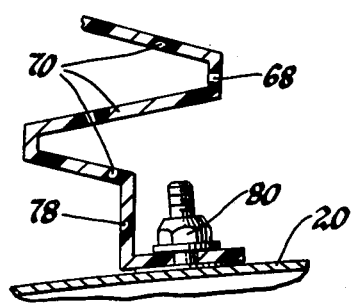
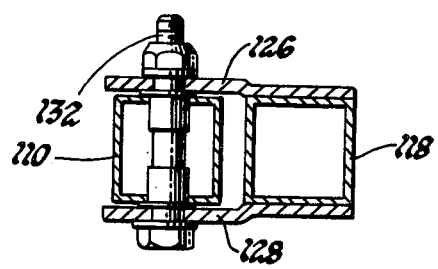
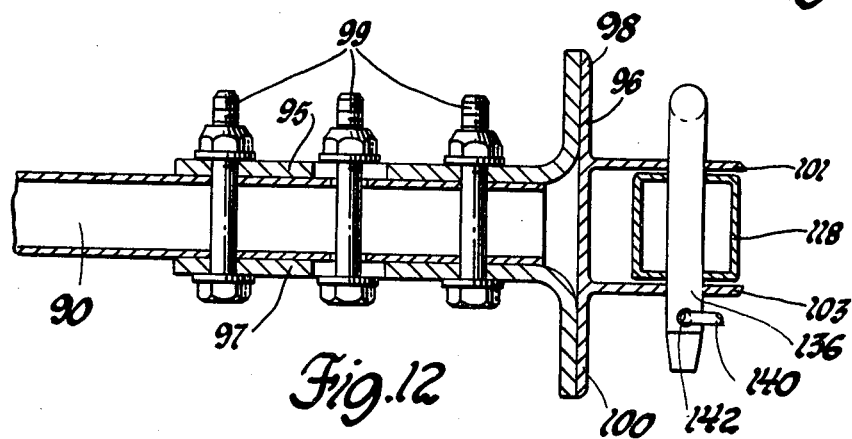

GUIDE FOR COLLAPSIBLE DRAG REDUCER

The invention relates to a roof mounted aerodynamic drag reducer including a hinged deflector panel and folding side members of flexible material and more particularly provides a guide rod mechanism for supporting the flexible side members and assuring proper folding of the side member upon collapse of the deflector panel to the stored position upon the cab roof.

BACKGROUND OF THE INVENTION

It is known to provide a roof mounted air deflector panel which is hingedly mounted for pivotal movement relative to the cab roof.

One such aerodynamic drag reducer is disclosed in Taylor et al. U.S. Pat. No. Taylor et al. 4,165,543 assigned to the assignee of this invention. The aerodynamic drag reducing efficiency of the pivotal deflector panel is enhanced by the use of adjustable bellows type side members of flexible material which extends between the cab roof and the deflector panel. The side members are preferably molded of a semi-rigid urethane and include a plurality of foldably interconnected segments of a triangular shape which fold and unfold relative to one another to accommodate variation in the angle of the deflector panel relative to the cab roof.

It is characteristic of such side members that the flexibility thereof required to enable folding and unfolding during pivotal movement of the deflector panel also permits the side members to be bowed inwardly or outwardly by air pressure or to flap back and forth in the air stream. Furthermore the flexible material may be difficult to control during collapse of the deflector panel to the stored position on the cab roof so that the folded segments may bunch inwardly or outwardly instead of folding and stacking neatly on top of each other.

Accordingly it would be desirable to provide a guide arrangement which would support the side member segments relative one another when the deflector panel is raised and would function to guide the segments for stacking storage one atop another when the deflector panel is collapsed to the stored position upon the cab roof.

SUMMARY OF THE INVENTION

Flexible side members of semi-rigid mold urethane extend between a pivotally mounted deflector panel and the cab roof. The side members are formed of a plurality of foldably interconnected triangular segments which fold and unfold relative one another during movement of the deflector panel between a raised air deflecting position and a stored position upon the cab roof. A guide rod is pivotally mounted upon the deflector panel and depends downward therefrom. A plurality of eyelets are provided on the triangular segments and slidably receive the guide rod. Accordingly, when the deflector panel is raised in the air deflecting position the guide rod and eyelets cooperate to support and control the side member segments against lateral movement. Upon collapse of the deflector panel to the stored position upon the cab roof the guide rod and eyelets maintain the segments in line with one another for controlled stacking one atop another.

Accordingly the object, feature and advantage resides in the provision of a guide mechanism acting between a deflector panel and flexible side members to control and guide the folding movement of the flexible side members.

DESCRIPTION OF THE DRAWINGS

These and other objects, features and advantages of the invention will become apparent upon consideration of the specification and the appended drawings in which:

FIG. 3 is a side elevational sectional view taken in the direction of arrows 3—3 of FIG. 1 and showing the drag reducer raised to the normal air deflecting position;

FIG. 4 is a view similar to FIG. 3 but showing the drag reducer collapsed to the stored position; and FIGS. 5 through 12 are sectional views taken in the direction of the correspondingly designated arrows of FIG. 3.

DESCRIPTION OF THE PREFERRED EMBODIMENT

Figure 1:
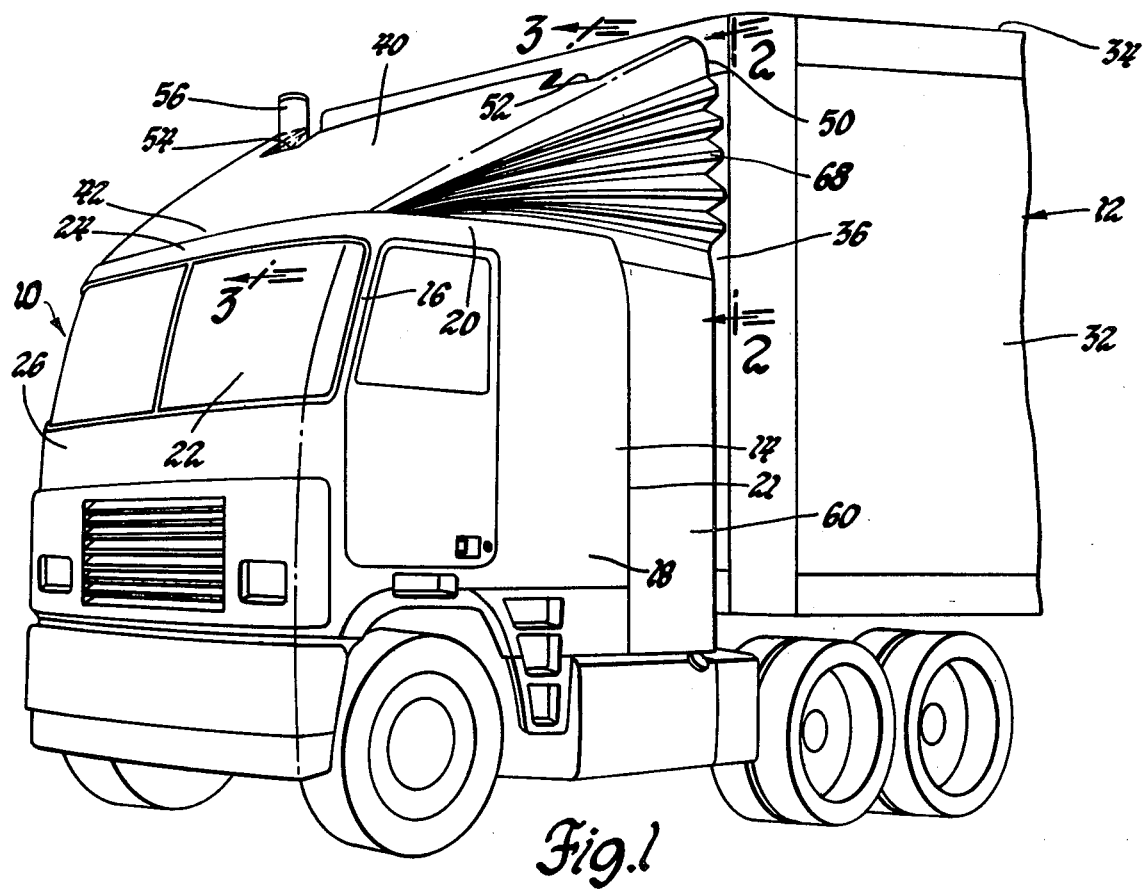
FIG. 1 is a perspective view of a tractor-trailer vehicle having a drag reducer according to the invention.

Referring to FIG. 1, the conventional tractor trailer vehicle includes a tractor 10 and a trailer 12. The tractor 10 has a sleeper cab-over-engine configuration, but alternatively could be a nonsleeper cab-over-engine or a conventional configuration. The cab 14 of the tractor 10 includes windshield pillars 16, cab sidewalls 18, and a cab rear wall 21 which support the cab roof 20. Windshield 22 is flush with windshield pillar 16, a windshield header 24, and a front panel 26 of the cab 14 so that the cab 14 presents a bluff frontal contour to the approaching airstream.

The conventional trailer 12 has a rectangular shape and includes sides 32, a roof 34 and a front wall 36. The cab 14 of the tractor 10 and the front wall 36 of the trailer wall are spaced longitudinally of one another so that the tractor 10 can turn relative to the trailer 12. The roof 20 of the tractor 10 is at a lower elevation than roof 34 of the tractor 12.

As seen in FIGS. 1 and 3, a rigid deflector panel 40, preferably of resin transfer molded fiberglass, has a leading edge 42 which is disposed closely adjacent the windshield header 24. The leading edge 42 of the rigid deflector panel 40 is pivotally mounted on the cab roof 20 generally adjacent the windshield header 24 by a pivot bracket 44 attached to the cab roof 20 and a hinge link 46 which is suitably bolted to the rigid deflector panel 40 and connected to the anchor bracket 44 by a pivot bolt 48. A pair of these hinges is employed with one such hinge at each of the front corners of the deflector panel 40. The trailing edge 50 of the deflector panel 40 is recessed at 52 and 54 to accommodate the exhaust stack or engine air intake stack 56. The deflector panel 40 overhangs the rear wall 21 and terminates short of the trailer front wall 36 so that the tractor can articulate relative to the trailer 12.

Figure 2:
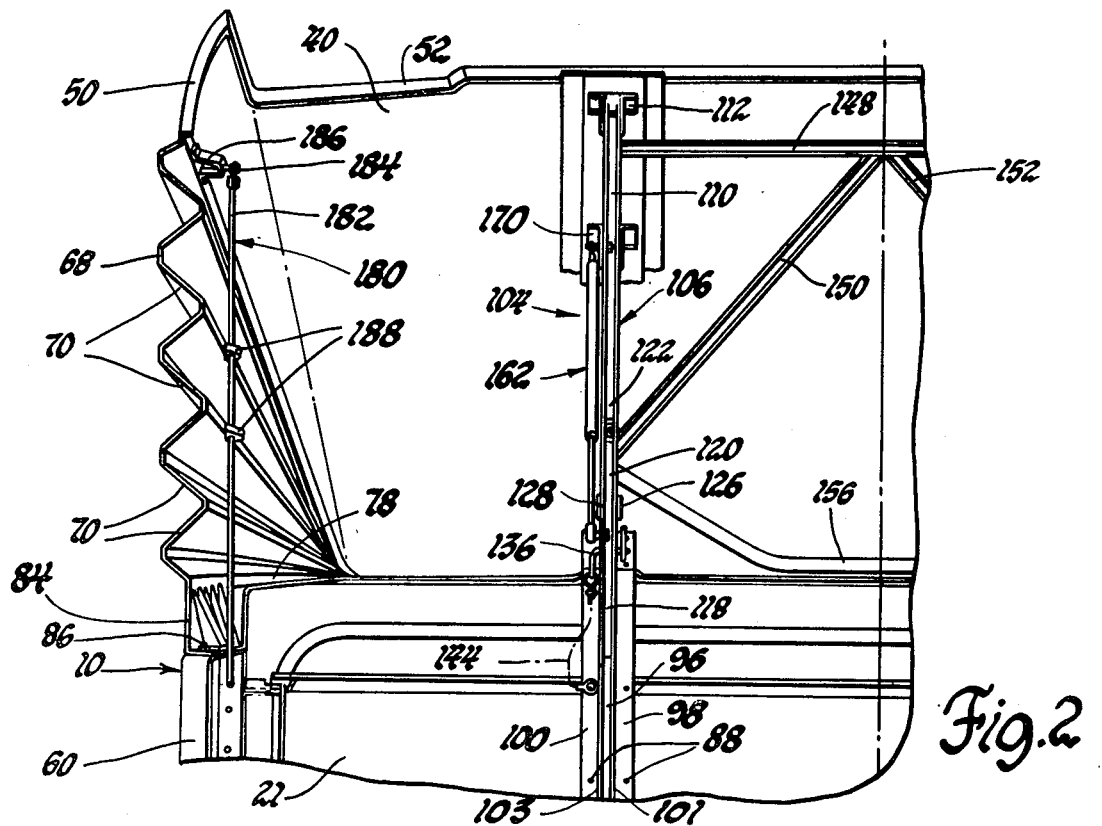
FIG. 2 is a view taken in the direction of arrows 2—2 of FIG. 1 and showing a rear elevation view of the drag reducer together with the collapsible support and guide rod therefor.

Referring to FIGS. 1, 2 and 3, it is seen that an extender panel 60 is attached to the rear wall 21 of the cab and aligns generally with the cab side wall 18 to aerodynamically extend the cab side wall 18 rearwardly toward the front wall 36 of the trailer. The extender panel terminates short of the trailer front wall 36 so that the tractor 14 can articulate relative to the trailer 12. A like extender panel 60 is provided at the other side of the cab 14. The extender panels are preferably constructed of molded fiberglass and have integrally formed stiffening ribs and the like which provide a wind and vibration resistant structural stiffness and facilitate attachment of the extender panels 60 to the cab rear wall 18 by appropriate bracketry, not shown.

Referring again to FIGS. 1 and 2, it is seen that the leading edge 42 of the deflector panel 40 is narrower than the trailing edge 50 thereof so that the deflector panel 40 has the plan form configuration of a truncated isosceles triangle. Furthermore, it is seen that the nonparallel side edges of a deflector panel 40 are connected to the cab roof 20 and the extender panels 60 by bellows-type air deflecting side members 68. The side members 68 are molded of a semi-rigid urethane and include a plurality of foldably interconnected segments 70 of a triangular shape which fold and unfold relative one another to accommodate variation in the angle of the deflector panel 40 relative to the cab roof 20.

As best seen in FIG. 7, the nonparallel side edge 74 of the rigid deflector 40 are curved downwardly and attached to the topmost segment 72 of the side members 58 by a plurality of rivets 76. FIG. 8 shows that the bottommost segment 78 of the side member is attached to cab roof 20 by nut and bolt assemblies 80. FIGS. 2 and 4 show that the rearwardmost portion of the side member 68 includes a flap 84 which depends from the bottommost segment 78 and is attached to the top of the extender panels 60 by a plurality of fasteners 86.

The angular position of the deflector panel 40 is varied between a raised wind deflecting position of FIGS. 1 and 3 and a lowered position of FIG. 4 by a support mechanism indicated generally at 104. The support mechanism 104 includes a pair of collapsible linkages, one of which is shown at 106, which are laterally spaced apart and act between the deflector panel 40 and a vertical support 96 having legs 98 and 100 attached to the rear wall 21 of the cab 14 by bolts 88. The vertical support 96 is braced by a longitudinal extending rail 90 having its forward end attached to the roof by a bracket 92, its intermediate portion attached to the cab roof by a bracket 94 and its rearward end attached to the vertical support 96 by brackets 95 and 97 and nut and bolt assemblies 99 and 105 as seen in FIGS. 9 and 12.

As seen best in FIGS. 2 and 3, the collapsible linkage 106 includes a support link 110 of square tubing having its upper end pivotally connected to the deflector panel 40 via a bracket 112 and a pivot bolt 114 as shown in FIG. 6. The bracket 112 is attached to a reinforcement 113 molded into the deflector panel 40 by screws 115 and weld nuts 117. The collapsible linkage 106 also has a pivot link 118 of square tubing including an upper end portion 120 which has a generally coextensive parallel relationship with a lower end portion 122 of the support link 110. The lower end of the pivot link 118 is pivotally connected to channel walls 101 and 103 of the vertical support 96 by a pivot bolt 124 as seen in FIG. 10. The lower end of the support link 110 is pivotally connected to a central portion of the pivot link 118 by brackets 126 and 128 which are welded or otherwise suitably attached to the pivot link 118 and surround the support link 110 as shown in FIG. 11. A pivot bolt 132 extends through the brackets 126 and 128 and through the support link 110.

As best seen in FIG. 3, the collapsible linkage 106 supports the deflector panel 40 at the raised wind deflecting position when the pivot link 118 and the support link 110 are established in the extended and generally coextensive parallel relationship shown in FIG. 3. This coextensive relationship is established by a screw mounted adjustable bumper pad 135 which is mounted at the upper end of the pivot link 118 and bears against the support link 110. This generally coextensive and extended position of the pivot link 118 and support link 110 is maintained by a latch pin 136, best seen in FIG. 12, which extends through aligned apertures in the channel walls 101 and 103 of the vertical support bracket 96 and aligned apertures in the pivot link 118. A retainer pin 140 extends through a hole 142 in latch pin 136 and is selectively removable therefrom to permit removal of the latch pin 136. The latch pin 136 is preferably connected to the vertical support 96 by a tether cable 144 so that the latch pin 136 is not inadvertently mislaid.

Referring to FIG. 2, it is to be understood that a second collapsible linkage like the collapsible linkage 106 shown therein is provided at the other side of the deflector panel 40 and is not shown in the drawing. The collapsible linkages 106 are connected by braces 148, 150 and 152 as well as a handlebar 156 which extend between the support links 110 of the collapsible linkages 106. The handlebar 156 is bowed downwardly as seen in FIG. 2 so that it is accessible to a vehicle operator standing on the tracter frame rails behind the cab 14.

As best seen by comparing FIGS. 3 and 4, the deflector panel 40 is lowered from the raised position of FIG. 3 to the stowed position of FIG. 4 by collapsing the collapsible linkage 106. This collapse is achieved by the vehicle operator withdrawing the retaining pin 140 from the latch pin 136 and then removing the latch pin 136 from the vertical support 96 and the pivot link 118. The handlebar 156 is then gripped and pulled rearwardly and downwardly so that the pivot link 118 is caused to pivot about the pivot bolt 124 at the lower end thereof. This pivoting movement of the pivot link 118 causes the pivot bolt 132 connecting the pivot link 118 with the support link 110 to move in the arcuate path shown by the arrow 160 of FIG. 3. Accordingly, the lower end of the support link 110 is pivoted rearwardly and withdraws the support link 110 downwardly from support of the deflector panel 110. The pivoting movement of the pivot link 118 continues through approximately 180° degrees of rotation until the pivot link 118 obtains the vertical position of FIG. 4 in generally parallel relationship with the support rod 110. The latch pin 136 is then reinstalled between the pivot link 118 and the vertical support 96 to retain the collapsible linkage 106 in the collapsed position and thereby retain the deflector panel 40 at its stowed position of FIG. 4.

Return of deflector panel 40 to the raised position of FIG. 3 is performed by lifting the handlebar 156 upwardly and outwardly to effect pivoting movement of the pivot link 118 and return the support link 110 to its position of FIG. 3. This lifting of the deflector panel 40 is assisted by a gas spring assembly 162 or the like which has a rod 164 connected to the bracket 97 by a pivot 166 shown in FIG. 9. The rod 164 telescopes within a cylinder 168 connected to a bracket 170 of deflector panel 40 by a pivot 172 shown in FIG. 5. In general, the gas spring assembly 162 has a compressed gas housed therewithin and acting to extend the length of the gas spring 162 so that the deflector panel 10 is urged to the raised position.

Referring to FIGS. 2 and 3 there is shown a guide rod assembly 180 which functions to support and guide the side member 68. The guide rod assembly 180 includes a rod 182 which is pivotally connected to the deflector panel 40 by a pivot pin 184 and bracket 186. A plurality of eyelets 188 are connected to the side member 68 at the juncture between the triangle-shaped segments 70 and slidably receive the guide rod 182. Accordingly, the guide rod 182 stiffens the side member 68 so that crosswind buffeting the side member 68 will not cause excessive bowing, flutter, or flapping of the side member 68. The guide rod 182 slides through the eyelets 188 upon movement of the deflector panel 40 between the raised and stowed positions and assures that the segments 70 fold neatly one upon the other when the deflector panel 40 obtains the stowed position of FIG. 4.

Thus it is seen that the invention supports and guides the flexible side member of an aerodynamic drag reducer through the use of a guide member such as a rod pivotally depending from the deflector panel in cooperation with guide follower members such as eyelets attached at intervals along the side member and slidably engaging with the guide member to support the flexible side member in its extended position and guide the folding of the side member to the collapsed position.

While the best mode for carrying out the invention has been described herein, those skilled in the art to which this invention relates will recognize various alternatives, designs and embodiments for practicing the invention within the scope of the following claims:

The embodiments of the invention in which an exclusive property or privilege is claimed are defined as follows:

1. A tractor trailer aerodynamic drag reducer for use on the tractor roof of a tractor cab comprising:
   a deflector panel having a leading edge and laterally spaced apart side edges;
   hinge means mounting the leading edge of the deflector panel on the roof to permit pivotal movement of the deflector panel relative to the roof;
   means acting between the deflector panel and the roof to effect pivotal movement of the deflector panel;
   an air deflecting side member extending vertically between each side edge of the deflector panel and the roof, said side members being a flexible foldable material folding and unfolding to accommodate pivotal movement of the deflector panel and having top edges attached to the deflector panel and bottom edges attached to the roof;
   guide means attached to the deflector panel and depending therefrom adjacent to the side members;
   and guide follower means attached to the side members intermediate the top and bottom edges thereof and slidably inter-engaged with the guide means to guide folding and unfolding of the side members upon pivotal movement of the deflector panel relative to the roof.

2. A tractor trailer aerodynamic drag reducer for use on the tractor roof of a tractor cab comprising:
   a deflector panel having laterally spaced apart side edges and a leading edge hingedly mounted on the roof to permit pivotal movement of the deflector panel relative to the roof;
   an air deflecting side member extending vertically between each side edge of the deflector panel and the roof, said side members having a plurality of foldably interconnected elements for folding and unfolding to accommodate pivotal movement of the deflector panel;
   a guide rod pivotally attached to the deflector panel and depending therefrom adjacent to the side members;
   and a plurality of eyelet members attached to the side members at spaced intervals and slidably inter-engaged with the guide rod to guide folding and unfolding of the side members upon pivotal movement of the deflector panel relative to the roof.

* * * * *